July 11, 1961 H. M. KENNEDY 2,991,890
SIDE BOOM ATTACHMENT FOR TRACTORS
Filed May 14, 1959 6 Sheets-Sheet 1

INVENTOR.
HARRY M. KENNEDY
BY-MAHONEY, MILLER
& RAMBO, ATT'YS.

July 11, 1961 H. M. KENNEDY 2,991,890
SIDE BOOM ATTACHMENT FOR TRACTORS
Filed May 14, 1959 6 Sheets-Sheet 4

INVENTOR.
HARRY M. KENNEDY
BY—MAHONEY, MILLER
& RAMBO, ATT'YS.

July 11, 1961 H. M. KENNEDY 2,991,890
SIDE BOOM ATTACHMENT FOR TRACTORS
Filed May 14, 1959 6 Sheets-Sheet 5

INVENTOR.
HARRY M. KENNEDY
BY- MAHONEY, MILLER
& RAMBO, ATT'YS.

2,991,890
SIDE BOOM ATTACHMENT FOR TRACTORS
Harry M. Kennedy, Bucyrus, Ohio, assignor to The Superior Equipment Company, Bucyrus, Ohio, a corporation of Ohio
Filed May 14, 1959, Ser. No. 813,265
11 Claims. (Cl. 212—8)

My invention relates to a side boom attachment for tractors. It has to do, more specifically, with that type of tractor having rubber-tired wheels spaced longitudinally at each side thereof and with a side boom attachment which includes units mounted at each side of the tractor in the respective side spaces between the rearward edge of a forward tire and the forward edge of a rearward tire carried by respective forward and rearward wheels.

The use of side booms on tractors has become common for various lifting and transporting operations. For example, one common use is in laying pipe in a trench along which the tractor is moved. It is important that side boom attachments of this nature be capable of lifting heavy loads adjacent the one side of the tractor without unbalancing the tractor or creating excessive strains in the side boom attachment or tractor.

Most side boom attachments have been applied to tractors of the crawler type. One of the reasons for this is that it is very convenient to support the side boom attachment on the crawler frame at either side of the tractor. However, for many uses, as when the crawlers must operate over city streets or sidewalks, the crawler type tractor is not desirable because of its tendency to damage pavements. For such work, a rubber-tired tractor is more desirable.

With this general type of tractor with side boom attachment, the driver of the tractor also operates the side boom attachment. With prior art machines, the control cables for the side boom pass over the driver's seat to a winch on the opposite side of the tractor from the location of the boom. The boom cables are a hazard to the driver in ordinary operations of the attachment and there is always the possibility of a cable snapping and causing serious injury to the operator. However, it has been impractical to avoid this danger by locating the winch, that raises and lowers the boom, on the same side of the tractor where the boom is located in order to obtain the proper angles of pull of the cables on the boom in all its necessary positions.

One of the objects of my invention is to provide a side boom attachment on tractors of the wheeled type including longitudinally spaced forward and rearward wheels with spaces therebetween wherein the attachment is located between the forward and rearward wheels and is attached to the main body or frame of the tractor.

Another object of my invention is to provide a tractor with a side boom attachment of the type indicated in which units of the attachment are located at both sides of the tractor in order to obtain substantial even distribution and balance of the parts of the attachment on each side of the longitudinal center line of the machine.

Another object of my invention is to provide means for stabilizing the tractor frame relative to the axles and wheels thereof as the side boom attachment is used to lift a load so as to eliminate the tendency for the frame to rock towards the loaded side of the tractor.

An additional object of this invention is to provide means for quickly releasing the load in case the capacity of the attachment is exceeded and the tractor starts to tilt toward the loaded side thereof.

Still another object of my invention is to provide a tractor with a side boom attachment in which all of the cables for controlling the boom pass beneath the tractor body or frame or are self-contained on the boom side of the frame so that they will not interfere with movements of the operator in the driver's seat of the tractor and will not constitute a hazard to him.

A further object of my invention is to provide a simple cable arrangement for raising and lowering the boom of the attachment and provide for proper and efficient angle of pull of the cable on the boom regardless of the controlled position of the boom.

Another object of this invention is to provide a side boom attachment for a tractor of the type indicated which may be equipped with a front loader or other front attachment, the attachment being so disposed that it will not interfere with the operation of the front loader.

Various other objects will be apparent from the drawings and as this description progresses.

The preferred embodiment of my invention is illustrated in the accompanying drawings but it is to be understood that specific details thereof may be varied without departing from basic principles.

Figures 1, 4, 5:
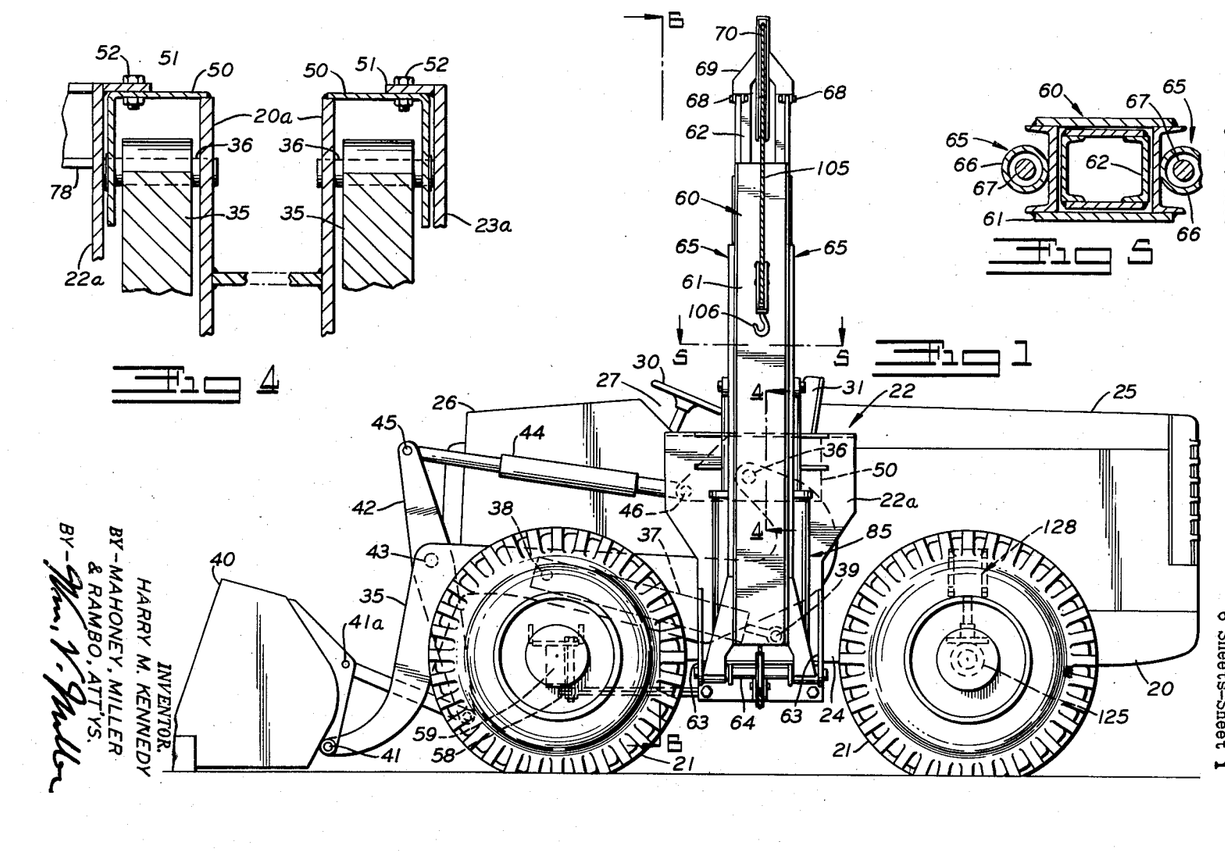
FIGURE 1 is a side elevational view showing a tractor of the wheeled or rubber-tired type having a front loader and being equipped with a side boom attachment in accordance with my invention, the view being taken at the side where the boom is mounted.
FIGURE 4 is a fragmentary transverse vertical sectional view taken along line 4—4 of FIGURE 1.
FIGURE 5 is a horizontal sectional view taken along line 5—5 of FIGURE 1.
Figures 2, 3:
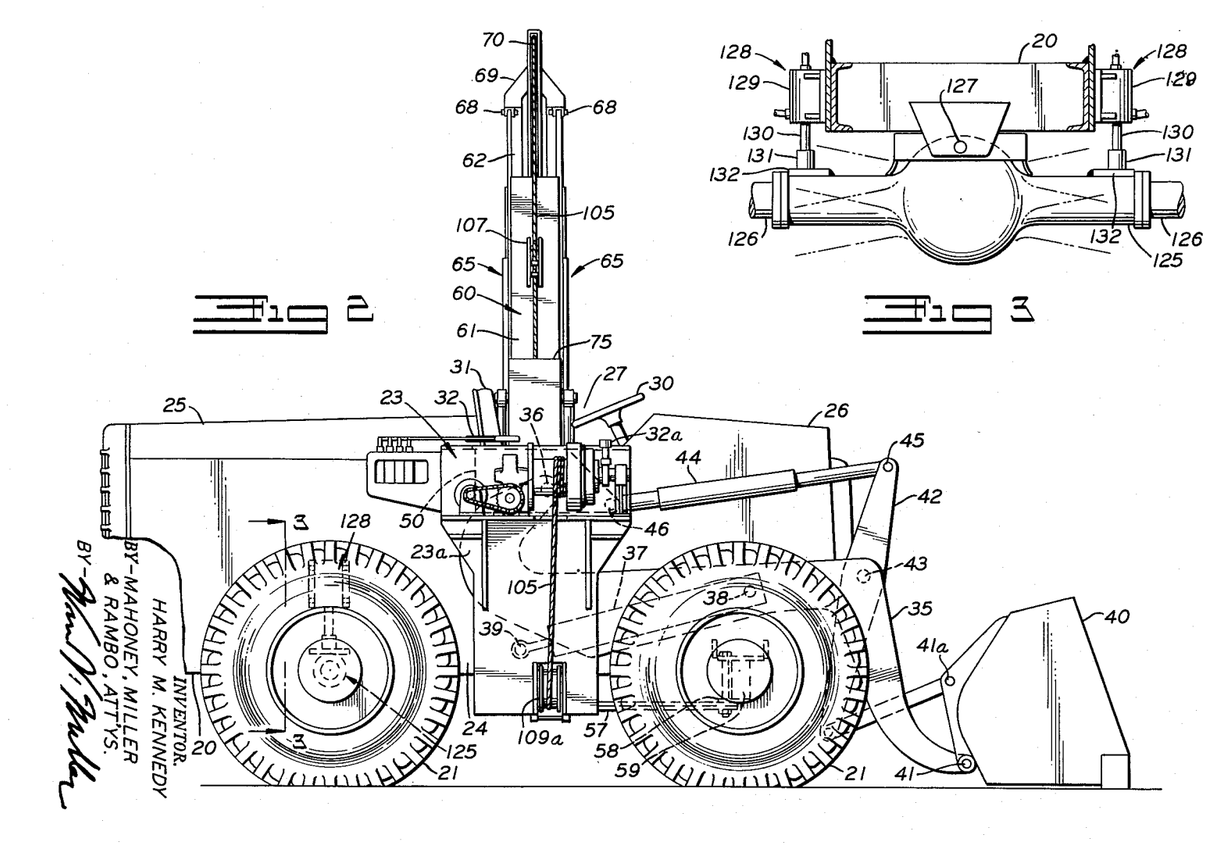
FIGURE 2 is a view similar to FIGURE 1 but taken at the opposite side of the tractor.
FIGURE 3 is a fragmentary-transverse vertical sectional view taken substantially along line 3—3 of FIGURE 2, showing the stabilizer associated with the rear axle which is pivoted to the main frame of the tractor.
Figures 6, 11:
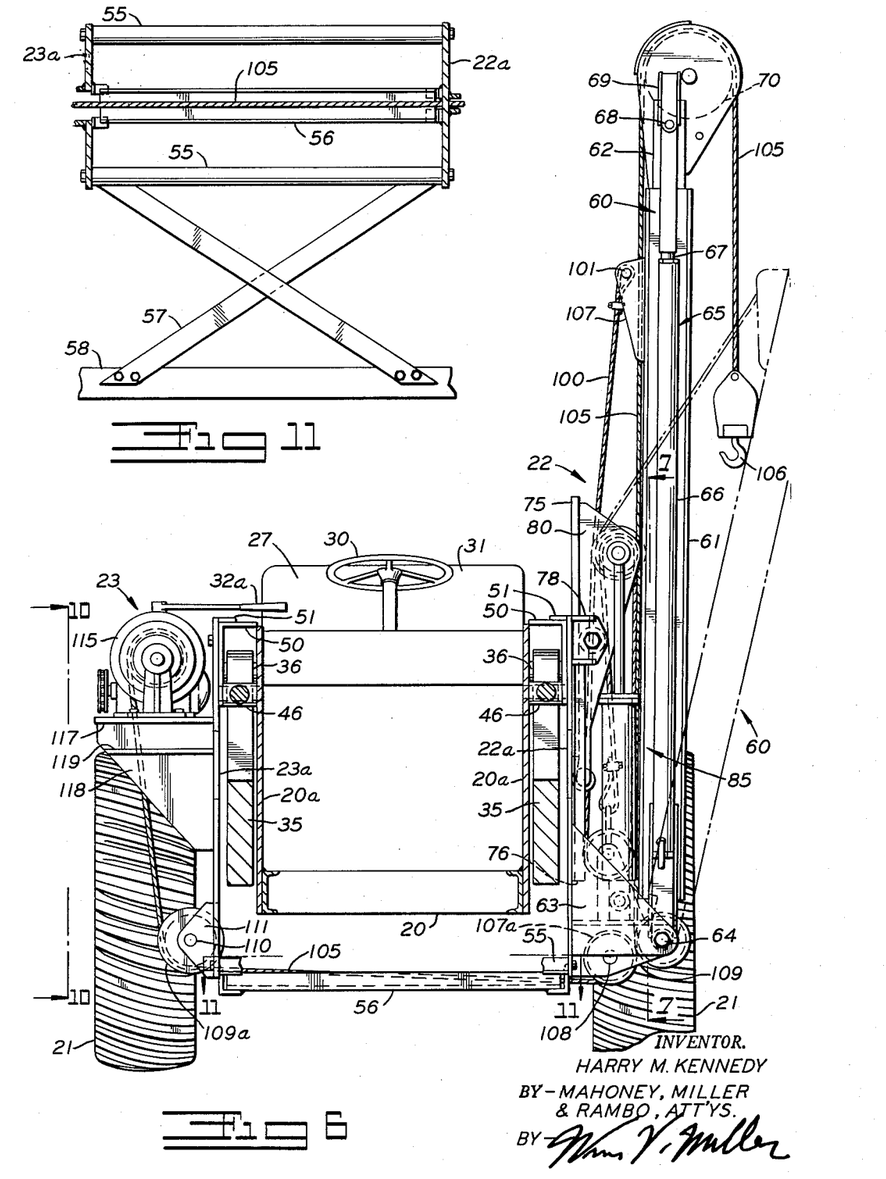
FIGURE 6 is a transverse vertical sectional view taken along line 6—6 of FIGURE 1.
FIGURE 11 is a horizontal sectional view taken along line 11—11 of FIGURE 6.

With reference to the drawings, I have illustrated in FIGURES 1, 2 and 6 the general structure of a tractor of the rubber-tired wheeled type which comprises a main frame 20 supported by the four wheels 21, a pair of these wheels being provided at each side of the tractor. These wheels are shown as having mounted thereon pneumatic tires. At each side, the front wheel is spaced from the rear wheel and it is in this space 24 at each side of the tractor where the main units of the side boom attachment of this invention are located. This attachment comprises the boom unit 22 located at the one side and the winch unit 23 located at the opposite side.

It will be noted that the tractor frame 20 carries a rear housing or hood 25 in which an engine of a suitable type is enclosed and at its front end is provided with a hood or housing 26, the driver's compartment 27 being located intermediate the housing or hood sections 25 and 26. This compartment 27 is substantially in alignment with the spaces 24 at each side in which the units 22 and 23 of my attachment are disposed. The compartment 27 includes the usual steering wheel 30 and the driver or operator's seat 31. The controls for driving the tractor along with the controls for the front loader are conveniently located in the compartment 27. Also, a bank of control levers 32 for the hydraulic system of the side boom attachment and a control lever 32a for the winch thereof is located conveniently to the operator or driver sitting in the seat 31.

The tractor is shown as having an attachment at its front end in the form of a front loader which includes the vertically movable main support arms 35 disposed at each side of the tractor and pivoted to the frame thereof at the support pivots 36. These arms 35 are moved vertically and controlled in their vertical movement by means of a pair of hydraulic rams 37 pivoted thereto at 38 and pivoted to the main tractor frame 20 at 39. The forward ends of the arms 35 have a material scoop 40 pivoted thereto at 41. This scoop is controlled by linkage 42 which is pivoted at 43 to the main support arms 35 and is connected to the scoop 40 by the pivots 41a. This linkage is actuated to control tilting of the scoop 40 on the arms 35 by means of a pair of hydraulic rams 44 which are pivotally connected to the links 42 at 45 and are pivotally attached to the frame 20 at 46. The details of the front end loader and the hydraulic control mechanism therefor are of a conventional nature and are not important to this present invention. However, the mounting and the relationship of my side boom attachment relative to the parts of the front end loader or other front end attachment are important, since the side boom attachment must be so mounted on the tractor and so located that it will not interfere with the operation of the loader and especially of the vertical movable support arms 35 thereof. Such arms may support the scoop 40 or some other front attachment such as a bulldozer blade.

As indicated best in FIGURES 4 and 6, the main frame 20 of the tractor includes the upstanding vertical plates 20a disposed at each side thereof in the space 24 between the front and rear wheels. At the upper end of each of the supports 20a there is provided a supporting bracket 50 welded thereto and which extends outwardly and downwardly therefrom. The vertically movable support arm 35 of the front end loader or other attachment has its pin of the supporting pivot 36 carried by the members 20a and 50, the arm being disposed between these members, as indicated. The boom unit 22 of the attachment of this invention is carried by a bracket 22a and the winch unit 23 of this invention is carried by a bracket 23a. Each of these brackets is suspended from the upper horizontal portion of the bracket 50 by means of an inwardly directed flange 51 which rests thereon and which is bolted thereto by the bolts 52. The brackets 22a and 23a extend downwardly at each side of the frame 20 in the space 24 between the front and rear wheels to a level below the lower level of the main frame 20. These plates 22a and 23a are rigidly tied together at their lower ends by means of a framework (FIGURE 11) which includes forward and rearward braces and spacers 55 and an intermediate transverse cable guide and guard channel 56. The forward brace and spacer 55 is connected by an X-frame 57 to a transverse beam or support 58 (FIGURE 11) which is associated with the front axle 59 which is carried by the frame 20 and which, in turn, carries the front wheels 21.

As indicated above, the unit 22 is carried by the support plate 22a in one of the spaces 24 at one side of the tractor between the front and rear wheels 21 at that side. This unit 22 includes an extendable and retractable boom 60 (FIGURES 1 and 6) which is pivoted to the plate 22a for vertical swinging movement in and out at the side of the tractor. The boom 60 is of telescoping construction and includes a lower section 61 of box-like beam form and an upper section 62 of box-like beam form which slides within the section 61 and projects upwardly therefrom. The support plate 22a has at its forward and rearward edges adjacent its lower end the outwardly extending triangular extensions 63. Between these extensions 63 the lower section 61 of the boom is disposed and the lower end of this section is pivoted to the plates 63 by means of pivot pins 64. It will be noted from FIGURE 6 that the pivot of the pins 64 is at the outer and lower angle of the plates 63.

The boom section 62 is extended and retracted relative to the boom section 61 by means of a pair of hydraulic rams 65 disposed at each side of the boom and extending vertically thereof and located within the boom 60 as shown in FIGURES 5 and 6. It will be noted from FIGURE 5 that each side of the boom section 61 is formed by an outwardly directed channel and that the cylinder 66 of each ram is disposed in the channel. The cylinder may be welded or otherwise fixed in the channel. Each cylinder 66 has a piston slidably mounted therein with a rod 67 projecting upwardly therefrom. The upper end of each rod 67 is connected at 68 (FIGURES 1 and 6) to a yoke 69 which is rigidly mounted on the upper end of the upper boom section 62. This yoke 69 carries a cable sheave 70. Thus, it will be apparent that by actuating the two rams 85 simultaneously, the boom section 62 may be extended relative to the boom section 61 or be retracted within the section 61. This will move the sheave 70 in and out relative to the end of the section 61 and, in effect, will retract or extend the boom 60. Furthermore, it will be apparent that the boom 60 is pivoted for vertical swinging movement about the lower pivot axis 64 in a vertical plane and in or out relative to the side of the tractor.

I provide means for swinging the boom 60 in or out relative to the side of the tractor and this means is mounted at the same side of the tractor on the plate 22a. It comprises a cable-sheaving arrangement, shown in FIGURES 6, 7 and 8, which will provide for proper and efficient angle of pull of the cable on the boom in its various swinging positions. Furthermore, this cable-sheaving arrangement for swinging the boom requires no cables passing over or into the driver's or operator's compartment 27.

Figure 7:
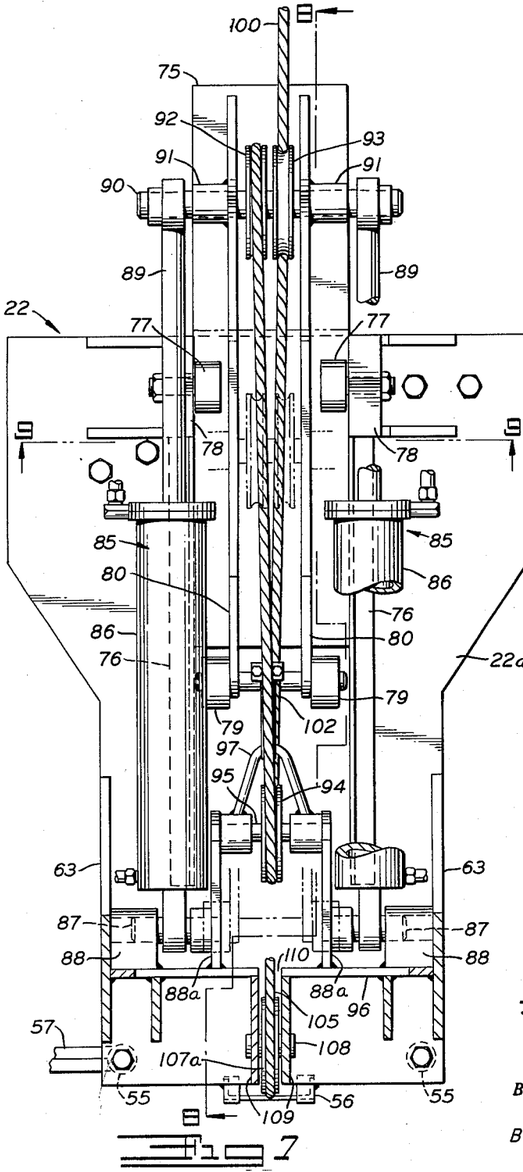
FIGURE 7 is a longitudinal vertical sectional view taken along line 7—7 of FIGURE 6.
Figure 8:
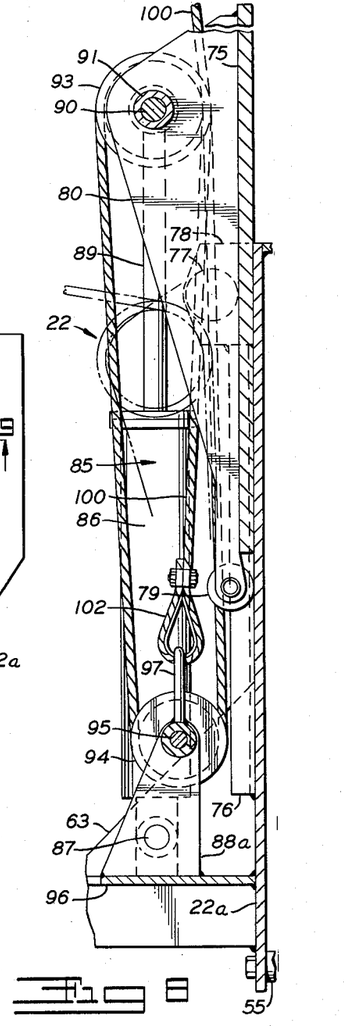
FIGURE 8 is a transverse vertical sectional view taken along line 8—8 of FIGURE 7.
Figure 9:
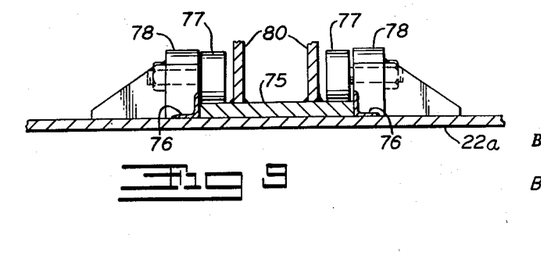
FIGURE 9 is a horizontal sectional view taken along line 9—9 of FIGURE 7.

The details of the cable-sheaving arrangement for raising and lowering the boom are illustrated best in FIGURES 7, 8 and 9. The arrangement comprises a vertically movable carriage plate 75 which is mounted for sliding movement between vertical guide angles or tracks 76 secured to the outer surface of the plate 22a. Upper thrust rollers 77 are rotatably carried by outwardly projecting lugs 78 on the plate 22a for engagement with the outer flat surface of the carriage plate 75. Lower thrust rollers 79 are attached to flanges 80 which are fixed to the plate, such as by welding, and which extend downwardly beyond its lower end, the rollers 79 contacting with the outer surface of the support plate 22a. The flanges 80 are vertically disposed in spaced parallel relationship and extend to the upper end of the carriage plate 75. Thus, when the plate 75 is moved vertically relative to the plate 22a, it is guided by the tracks 76. The rollers 77 will take the outward thrust and the rollers 79 will take the inward thrust developed on the carriage plate 75 during its vertical sliding movement to swing the boom 60, as will be more apparent later.

For sliding the carriage plate 75 vertically, a pair of hydraulic rams 85 are provided and are mounted on the support plate 22a at opposite sides of the plate 75 and outwardly of the tracks 76. Each ram 85 comprises a cylinder 86 which is pivotally mounted on a transverse pivot pin 87 carried by lugs 88 and 88a. The lugs 88 are fixed to the plates 63 and to a shelf plate 96 which extends horizontally between the plates 63 and is welded thereto. The lugs 89 are upstanding from the shelf 96. Extending from the upper end of each ram 85 is a piston rod 89. The two rams 85 are disposed with their axes in parallel relationship and the rods 89 thereof are, therefore, parallel. The upper ends of both rods 89 are pivoted to a transverse shaft 90 which passes through bearings 91 on the plate 75. These bearings are attached as by welding to the plate and to the outwardly projecting flanges 80 thereof. It will be apparent that control of the rams 85 will result in vertical movement of the plate 75.

The shaft 90 carries a pair of cable sheaves 92 and 93 disposed in spaced relationship thereon. An additional cable sheave 94 is carried toward the lower end of the plate 22a being mounted on a transverse shaft 95 which is carried by the upwardly extending lugs 88a. A cable-anchoring bail 97 is pivotally mounted on the shaft 95.

A single cable 100 is used for raising and lowering the boom 60. As shown in FIGURE 6, this cable 100 is connected at 101 to the boom adjacent the upper end of its lower section 61. This cable is passed down inside or behind the sheave 93 between the flanges 80 on the plate 75, which serves as a guide channel, and is passed beneath and outwardly around the lower sheave 94 which is at a fixed level on the shaft 95. The cable then passes upwardly around the outer side of the sheave 92 and then inwardly and downwardly to a loop connection 102 with the bail 97.

Vertical movement of the slide carriage plate 75 controlled by rams 85 will produce swinging of the boom 60. It will be apparent that upward movement of the carriage plate 75 and the sheave 92 carried thereby will shorten the effective length of the cable, which is anchored at the points 102 and 101, the latter being at the boom 60 and the former at a fixed level relative to the plate 22a, and will swing the boom inwardly and upwardly. Downward movement of the plate 75 will lower the sheave 92 and will increase the effective length of the cable allowing the boom 60 to swing downwardly and outwardly. Because the sheave 92 moves upwardly as the boom swings upwardly and moves downwardly as the boom swings downwardly, a more direct and efficient line of pull of the cable 100 on the boom 60 will result than if the sheave 92 were at a fixed level or a winch was provided at a fixed level.

A load-hoist cable 105 is passed around the sheave 70 on the upper end of the boom 60, as shown in FIGURES 1 and 6. This cable has a load hook 106 on its outer end. The cable passes inwardly and downwardly around the sheave 70 and along the inner side of the boom 60. It passes through a guide bracket 107 at the inner side of the lower section 61 of the boom which is used to provide the anchoring point 101 for the cable 100 previously mentioned. The cable 105 passes downwardly along the boom 60 to a point adjacent the pivot axis 64 thereof where it then passes beneath an idler sheave 107a which is carried by a shaft 108 (FIGURES 6 and 7) mounted on depending lugs 109 which are welded or otherwise secured to the lower side of the horizontal shelf plate 96, it being apparent that the cable passes downwardly through an opening 110 in this plate 96. The sheave 107a is supported adjacent one end of the cable guide 56 of the bracing frame structure attached to the plates 22a and 23a beneath the tractor frame. The cable passes through this guide 56 underneath the tractor to the opposite side of the tractor where it is passed upwardly around an idler sheave 109a. This sheave 109a is carried by a shaft 110 which is rotatably supported by a bracket 111 attached to the lower end of the plate 23a.

Figure 10:
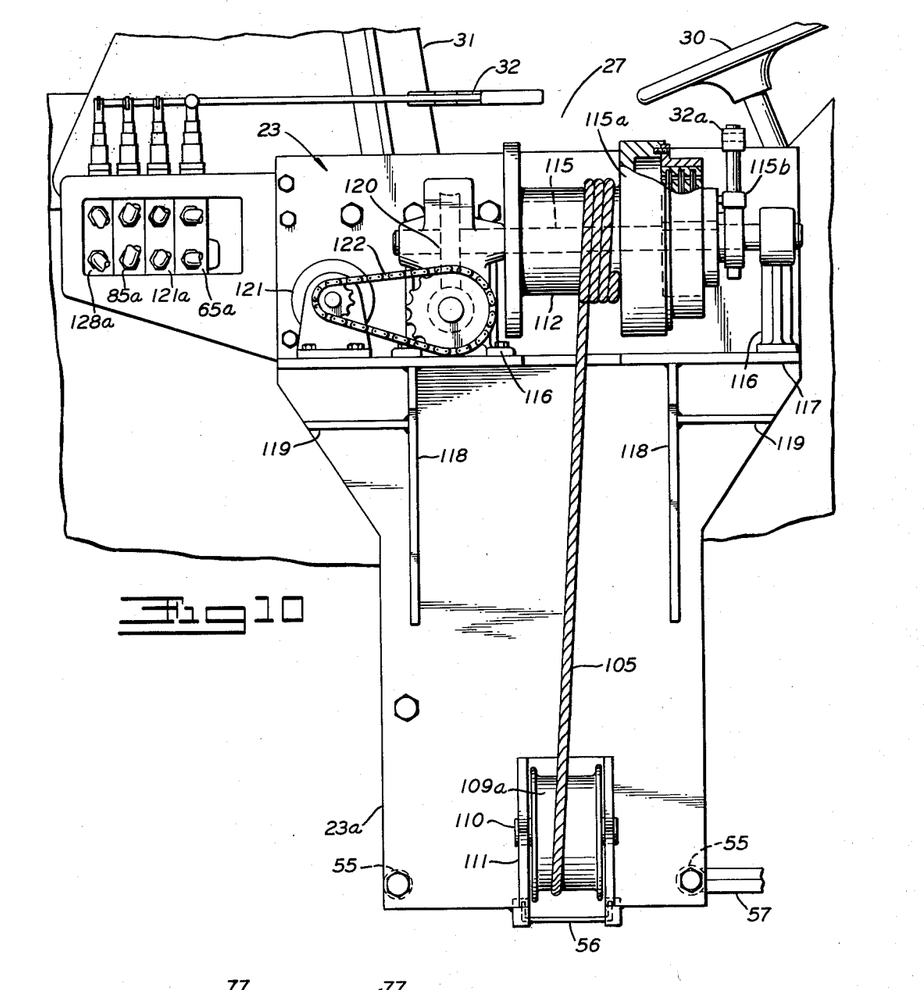
FIGURE 10 is a side elevational view taken along line 10—10 of FIGURE 6.

As shown in FIGURES 6 and 10, the idler sheave 109a is a wide sheave to permit lateral movement thereon as the cable 105 winds on the drum 112 of the winch unit 23. The cable passes upwardly from the sheave 109 and is anchored to the drum 112. The drum 112 is rotatably mounted on a shaft 115 which extends transversely at the upper end of the plate 23a being supported on bearing stands 116 which are upstanding from a shelf 117 horizontally disposed and fixed to the outer surface of the plate 23a at a point spaced substantially from the upper end thereof. The shelf 117 is braced by the gusset plates 118 which are welded to the plate 23a and reinforcing plates 119.

The drum 112 although rotatably mounted on the shaft 115 is normally prevented from rotating relative thereto by means of a friction clutch unit 115a which includes disks splined to the drum 112 and members splined to the shaft 115 which are normally held in friction contact by a cam lock 115b that may be released quickly by means of an actuating handle 32a. This drum friction lock or clutch can be quickly disengaged by means of the handle 32a for free-spooling of the drum 112 on the shaft 115 in case of excessive loading of the boom 60 which could tend to tip the tractor toward the boom side. However, ordinarily the drum 112 rotates with the shaft 115. The shaft 115 is preferably driven by a worm and gear mechanism 120 which, in turn, is driven by means of a hydraulic motor 121, these two units being operatively connected together by a chain and sprocket drive 122. The motor 121 and the unit 120 are supported by the shelf 117 as indicated. The use of the hydraulic motor 121 in combination with the worm and gear mechanism 120 makes it possible for the operator to inch the load suspended from the hook 106 into place. The handle 32a for releasing the clutch 115a is readily accessible to the operator sitting on the seat 31.

It will be apparent that by controlling the hydraulic motor 121, the cable 105 may be spooled in or payed out and this will raise or lower the hook 106 on the boom 60. In case of emergency, the drum 112 may be quickly released for free paying out of the cable. The cable 105 will pass from the boom side of the tractor to the winch side beneath the tractor so that it will not interfere with normal actions of the operator in the compartment 27 in driving the tractor and controlling the attachment, and there will be no possibility of the cable striking the operator in case of breakage or accidental disconnection. Furthermore, the winch unit 23 can be located on the side of the tractor opposite to the boom side in the space 24 between the front and rear wheels 21 so as to provide sufficient space for the winch unit. Obviously, it would be difficult to locate that unit at the boom side because of the limited amount of space there which is occupied by the boom unit 22.

As indicated in FIGURE 3, the rear-axle housing in a tractor of this type is pivoted for oscillating movement in a vertical plane relative to the frame 20. The details of the mounting for this axle are not shown as they are not part of this invention. However, for general illustration, the axle housing 125 that carries the rear axles 126 for the rear wheels 21 is mounted for vertical oscillation about a center point 127 midway of the sides of the frame 20. To prevent oscillation of the frame during use of the side boom attachment, I provide a hydraulic stabilizing system. This hydraulic stabilizing system comprising a hydraulic ram 128 located at each side of the frame 20 adjacent the axle housing 125. Each ram comprises a cylinder 129 attached to the side of the frame and having a piston rod 130 depending therefrom. Each piston rod 130 is adapted to engage a stop abutment 131 carried by a bracket 132 attached to the axle housing 125 at its upper side. Obviously, if the rods 130 are brought into contact with the stop abutments 131 by operation of the rams 128, tilting of the frame 20 laterally relative to the axle housing 125 and all the wheels 21 will be precluded. Thus, this will preclude sidewise tilting of the entire frame 20 toward the side where the boom is handling the load. When using the front loader, the rods 130 of the stabilizer rams 128 are easily retracted to insure unhampered bucket operation during which pivoting of the axle housing 125 about the point 127 is desirable.

As previously indicated, the weight of the winch unit 23a aids in counterbalancing the weight of the boom unit 22. Also, as indicated, the stabilizers 128 stabilize the frame 20 relative to the wheels 21. However, if more counterbalance weight is desired at the side opposite the boom 22, the tires at that side may be filled with calcium chloride solution.

The boom can be extended or retracted at any time and in any position is occupies by operation of the rams. This expansion or contraction will change the level of the hook 106 and it may be desirable to operate the winch unit 23 at the same time.

Figure 12:
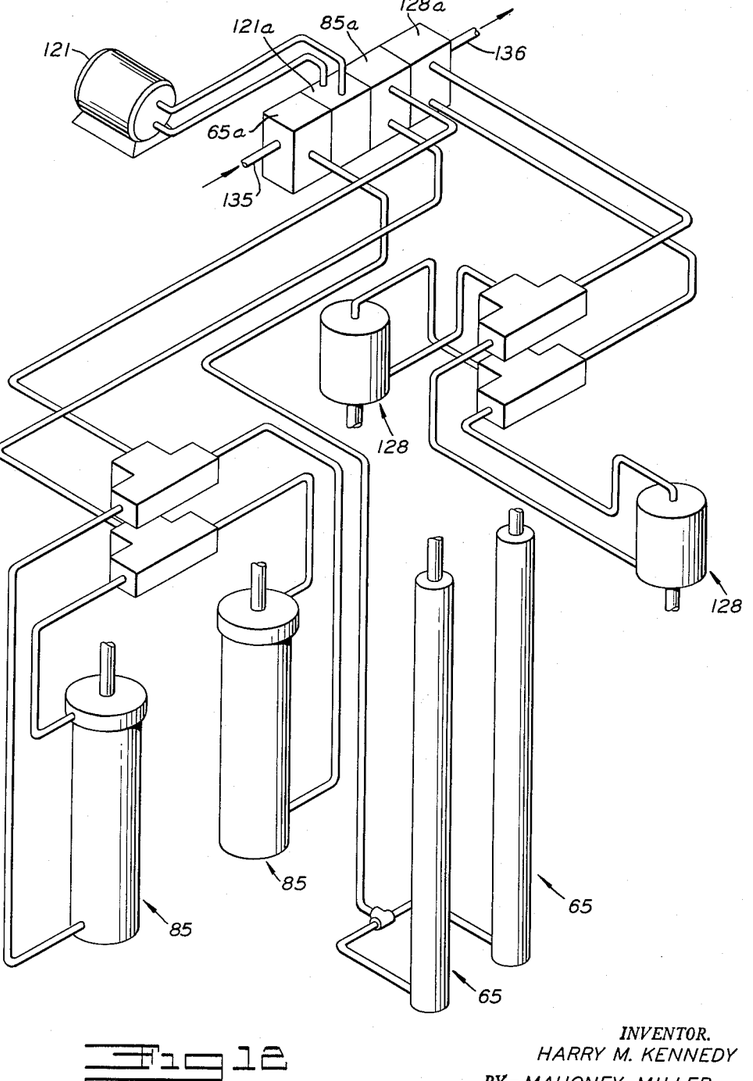
FIGURE 12 is a schematic view of the hydraulic system used on the tractor.

In FIGURE 12, I have illustrated diagrammatically a hydraulic system for controlling the various hydraulic rams and motor of the machine. The bank of valves controlled by the handles 32 include the four valves 65a, 121a, 85a, and 128a which control the boom telescoping rams 65, the winch driving motor 121, the boom angle control rams 85, and the stabilizer rams 128, respectively. The bank of valves have connected thereto a pressure line 135 for supplying hydraulic pressure from a suitable source, such as a pump, and an exhaust line 136. The rams 65 extend the boom 60 by hydraulic pressure but it returns by gravity so they are single-acting rams. Therefore, the valve 65a is a single-acting valve. The valve 121a for controlling the motor 121 is a double-acting valve since it is desirable to drive the winch in either direction by reversing the motor 121. The rams 85 for controlling the angle of the boom 60 are double-acting rams so the valve 85a which controls them is a double-acting valve. The stabilizer rams 128 are double-acting since it is desirable to extend or retract the stabilizer rods 130 by pressure so the valve 128a is a double-acting valve. Thus, all of the different units of the attachment can be controlled hydraulically from the driver's or operator's compartment 27.

It will be apparent from the above description that I have provided a side boom attachment which can be applied readily to a tractor of the wheeled type which has limited space at each side between forward and rearward wheels. Units of the attachment are disposed in spaces at opposite sides of the machine and tend to counterbalance each other. The units at opposed sides are rigidly connected together and to the frame of the tractor. Stabilizing means is provided for stabilizing the frame even though the load is exerted at one side of the tractor. In case the capacity of the side boom is exceeded, means is provided for immediately releasing the load to prevent tipping of the tractor. The boom of the attachment is controlled as to its angular position by a simple cable-receiving arrangement which provides for maintaining in most angular positions of the boom a most efficient angle of pull. Although units of the attachment are disposed on both sides of the tractor to better utilize the limited space available, no cables pass through or over the operator's compartment so that there is on interference with his movements in driving the tractor or operating the attachment units, and there is no danger of injury to him by the cables.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination with a vehicle having a frame carried by forward and rearward wheels at each side thereof with a space between the forward and rearward wheels at each side thereof, a side boom attachment on the tractor, said attachment comprising a boom having a load-carrying member and being mounted in the space at one side thereof between the forward and rearward wheels at that side for vertical swinging movement laterally of the tractor frame, a first unit at the latter side supported by the tractor frame and disposed in the latter space for controlling the vertical swinging movement of the boom, and a second unit at the opposite side of the tractor in the space at that side between the forward and rearward wheels thereof for controlling raising and lowering of said load-carrying member relative to the boom, said first unit comprising a cable-reeving unit for controlling a cable which is connected to said boom and to a point fixed relative to said frame, said cable-reeving unit comprising a cable sheave mounted in fixed vertical position and a cable sheave mounted for vertical movement relative to the fixed sheave, means for moving said last-named sheave to vary the effective length of the cable to thereby control the angular position of the boom, and said second unit comprising a winch mounted on the tractor frame and a cable for winding on said winch and passing beneath said tractor frame to the boom side and along said boom to a point of connection with said load-carrying member.

2. The combination of claim 1 including means on said frame and connected to said winch for driving said winch and which includes a quick-release clutch, and means for releasing said clutch.

3. The combination of claim 1 in which a pair of the wheels are carried by an axle unit attached to the frame for relative vertical oscillation about a pivot point in a plane fixed transversely of said frame, and a stabilizer system between the axle unit and said tractor frame, said stabilizer system including adjustable members carried by said frame on opposite sides of said pivot for engaging the axle unit.

4. The combination of claim 3 in which the axle unit engaging members are carried by double-acting hydraulic rams, and a double-acting control valve for controlling said rams.

5. The combination of claim 1 in which the first and second units are carried by plates attached to the sides of the tractor frame in said spaces, and a bracing frame connecting said plates rigidly together and being disposed beneath said tractor frame.

6. The combination of claim 5 in which said bracing frame includes a cable guide extending therealong transversely of said frame between the sides thereof for receiving and guiding the cable passing from said winch to said boom.

7. In combination with a vehicle having a frame carried by forward and rearward wheels at each side thereof with a space between the forward and rearward wheels at each side thereof, said vehicle having an attachment comprising arms mounted at each side for vertical movement in planes longitudinally thereof, a side boom attachment on the tractor, said attachment comprising a boom having a load-carrying member and being mounted in the space at one side thereof between the forward and rearward wheels at that side for vertical swinging movement laterally of the tractor frame, a first unit at the latter side supported by the tractor frame and disposed in the latter space for controlling the vertical swinging movement of the boom, and a second unit at the opposite side of the tractor in the space at that side between the forward and rearward wheels thereof for controlling raising and lowering of said load-carrying member relative to the boom, said first unit comprising a cable-reeving unit for controlling a cable which is connected to said boom and to a point fixed relative to said frame, said cable-reeving unit comprising a cable sheave mounted in fixed vertical position and a cable sheave mounted for vertical movement relative to the fixed sheave, means for moving said last-named sheave to vary the effective length of the cable to thereby control the angular position of the boom, and said second unit comprising a winch mounted on the tractor frame and a cable for winding on said winch and passing beneath said tractor frame to the boom side and along said boom to a point of connection with said load-carrying member, said units being spaced laterally outwardly from the sides of the tractor frame and said arms being mounted for vertical movement between the respective units and the adjacent sides of said tractor frame.

8. The combination of claim 7 in which each of said units is carried by a vertically disposed mounting plate, said arms of said first attachment being carried by brackets attached to the sides of said tractor frame, the unit-carrying plates being attached to said brackets so as to be disposed outside of said arms.

9. The combination of claim 8 in which said plates are attached at their upper ends to said brackets, and a bracing frame disposed beneath the tractor frame and extending transversely thereof between the sides thereof, said bracing frame having its outer ends connected to the lower ends of said plates.

10. The combination of claim 9 in which the tractor frame has an axle-supporting structure with an axle mounted thereon carrying a pair of said wheels, said bracing frame being also attached to said axle-supporting structure.

11. The combination of claim 9 in which said bracing frame has a cable guide extending therealong transversely between said sides, said cable of said second unit passing through said cable guide from said winch to a point of connection with said load-carrying member on the boom.

References Cited in the file of this patent

UNITED STATES PATENTS

| | | |
|---|---|---|
| 710,472 | Lake | Oct. 7, 1902 |
| 2,400,803 | Barnhart | May 21, 1946 |
| 2,602,551 | White | July 8, 1952 |
| 2,717,701 | Pitman | Sept. 13, 1955 |
| 2,740,535 | Bill | Apr. 3, 1956 |
| 2,858,944 | Hutchinson | Nov. 4, 1958 |
| 2,909,290 | Nichols | Oct. 20, 1959 |

FOREIGN PATENTS

| | | |
|---|---|---|
| 1,168,351 | France | Sept. 1, 1958 |